United States Patent [19]

Sano

[11] Patent Number: 5,038,379
[45] Date of Patent: Aug. 6, 1991

[54] IMAGE INFORMATION SEARCHING APPARATUS

[75] Inventor: Yoshitaka Sano, Matsudo, Japan

[73] Assignee: Canon Kabushiki Kaisha, Tokyo, Japan

[21] Appl. No.: 309,957

[22] Filed: Feb. 9, 1989

Related U.S. Application Data

[63] Continuation of Ser. No. 761,591, Aug. 1, 1985, abandoned.

[30] Foreign Application Priority Data

Aug. 10, 1984 [JP] Japan ................. 59-166423

[51] Int. Cl.$^5$ ............................................. G06K 9/00
[52] U.S. Cl. ................................... 382/1; 353/26 R; 353/26 A; 382/30
[58] Field of Search ................. 382/1, 10, 30, 34; 353/25, 26 R, 26 A, 27 R, 27 A

[56] References Cited

U.S. PATENT DOCUMENTS

| | | | |
|---|---|---|---|
| 3,713,100 | 1/1973 | Hemstreet | 382/30 |
| 3,757,091 | 9/1973 | Baker | 353/26 A |
| 4,110,737 | 8/1978 | Fahey | 382/30 |
| 4,174,891 | 11/1979 | Flint et al. | 353/26 A |
| 4,324,484 | 4/1982 | Johnson | 353/26 A |
| 4,448,503 | 5/1984 | Axelrod et al. | 353/26 A |
| 4,514,641 | 4/1985 | Tanaka et al. | 353/26 A |
| 4,589,142 | 5/1986 | Bednar | 382/34 |
| 4,669,838 | 6/1987 | Hibbard | 353/26 A |
| 4,691,112 | 9/1987 | Wydler | 353/26 A |

Primary Examiner—Michael Razavi
Assistant Examiner—Joseph Mancuso
Attorney, Agent, or Firm—Fitzpatrick, Cella, Harper & Scinto

[57] ABSTRACT

There is an image information searching apparatus for analyzing the character information in the image information inputted from an image inputting apparatus and producing search information to search the image information. This apparatus comprises: a scanner to scan a recording medium such as a microfilm or a recording paper in which image information was recorded; this image information including discriminating information to discriminate this image information or a plurality of image information of the same group from another image information; a dictionary information memory section in which dictionary information such as a standard pattern of a character or a numeral to recognize the discriminating information was stored; a recognition controller to recognize the discrminating information using the dictionary information; and an image information memory section to store the recognized discriminating information as search information together with the image information corresponding thereto.

9 Claims, 3 Drawing Sheets

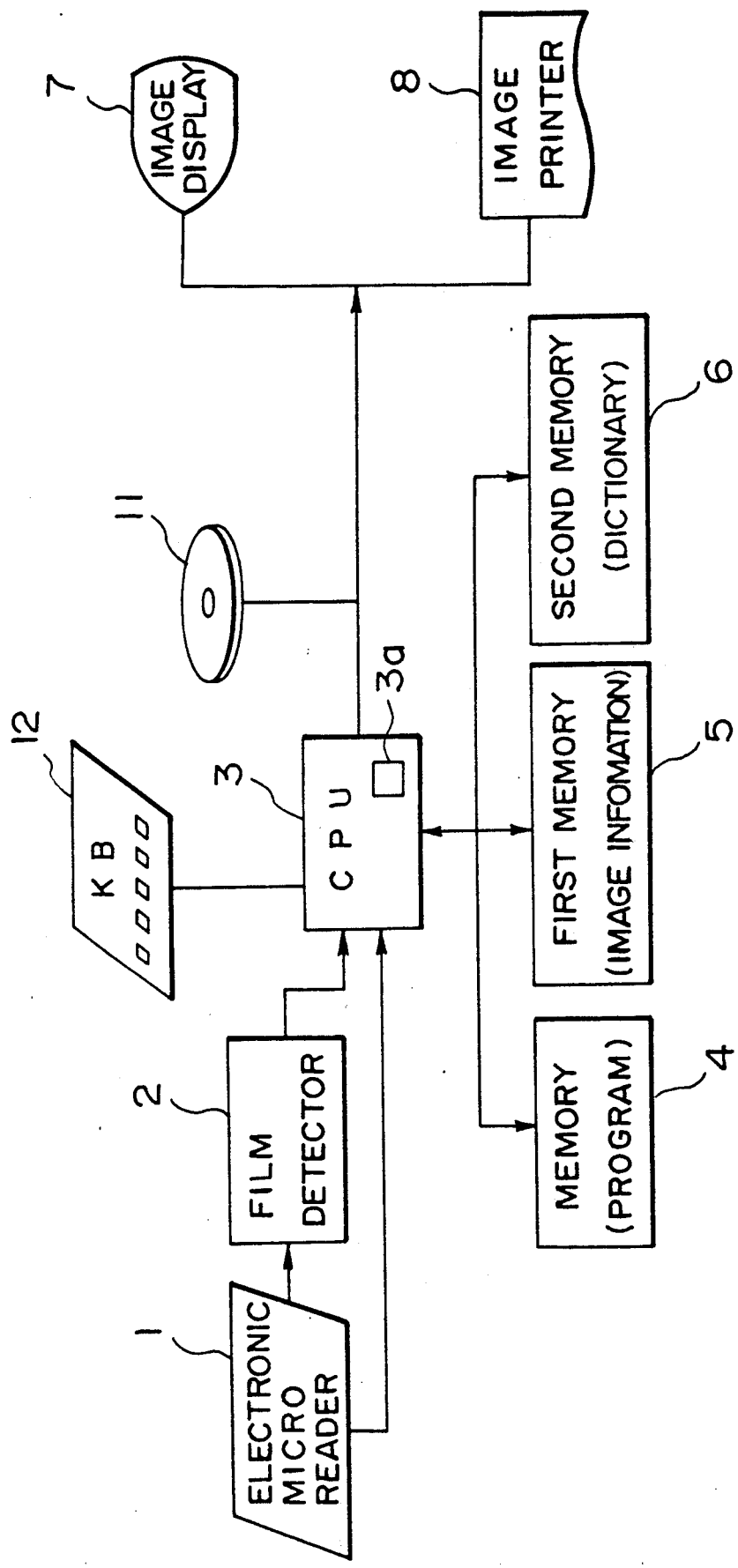
F I G. 1 ically a pick-up image in a micro cartridge film,
IMAGE INFORMATION SEARCHING APPARATUS This application is a continuation of application Ser. No. 761,591, filed Aug. 1, 1985, now abandoned.

BACKGROUND OF THE INVENTION

1. Field of the Invention

The present invention relates to an image information searching apparatus which analyzes character (image) information in the image information inputted from an image inputting apparatus and thereby producing search information to search the above-mentioned image information.

The present invention also relates to an image information searching apparatus having an image recognizing function to analyze character (image) information in the image information inputted from an image inputting apparatus and thereby to produce and display a character string.

2. Description of the Prior Art

Hitherto, in searching apparatuses, for example, in micro film systems, in case of setting a universal key word into each pick-up image in a micro cartridge film, the management number of the cartridge written on the casing or the like of the micro cartridge film, and the frame position, key word and title information of the pick-up image, and the like are inputted, and these data are stored into an external memory medium, and thereby in a sizing the multi-purpose image search.

However, since the operator inputs the management character number of a micro cartridge film by use of a keyboard apparatus, if the operator erroneously key-inputs in the external memory medium upon inputting, there are problems such that the key word attribute produced is made invalid and a desired pick-up image is missearched, so that an operating efficiency and a system processing performance are remarkably deteriorated, and the like.

Therefore, in case of searching objective image information, a demand for reduction and automatization of the troublesomeness and time to input the search information to search as little as possible is increasing. In other words, it is a present situation that an improvement in technology of interface (man-machine interface) between a man and a machine is demanded as compared with high function of equipment and systems. By solving this problem, the inherent advanced function and performance of the apparatus can be efficiently utilized.

SUMMARY OF THE INVENTION

It is an object of the present invention to eliminate the foregoing drawbacks in consideration of the above-mentioned points.

Another object of the invention is to read and analyze information to search in the image information inputted from an image inputting apparatus and thereby to produce the search information to search desired image information in consideration of the foregoing points.

Still another object of the invention is to eliminate the foregoing drawbacks and to read character information in the image information inputted from an image inputting apparatus and thereby to produce search information to search the image information in consideration of the above-mentioned points.

Still another object of the invention is to provide an image information search apparatus which reads and codes character information in the image information inputted from an image inputting apparatus and which stores the coded character information in a recording medium and thereby making the search of desired image information easy in consideration of the above-mentioned points.

Still another object of the invention is to provide an image information searching apparatus which reads and recognizes the management number written in a microfilm to search desired image information recorded in the microfilm and thereby making it possible to produce a search code in consideration of the above-mentioned points.

Still another object of the invention is to provide an image character recognizing apparatus in which by photographing character information as the management number of a micro cartridge film in one frame of the first image of a microfilm, this character information is read and analyzed immediately after the micro cartridge film was attached, and thereby making it possible to freely recognize the management character number of the micro cartridge film in consideration of the above-mentioned points.

Still another object of the invention is to eliminate the foregoing drawbacks and to recognize management information of data upon writing of the data into a file such as a photo disc or the like and then write this management information as search information in this file in consideration of the above-mentioned points.

Still another object of the invention is to provide an apparatus in which image information (including character information) drawn in a first data based, for example, a microfilm, a paper or the like is stored in a second data base, for instance, a magnetic disc, a photo disc, a photo magnetic disc, or the like (11) and a desired image information in the above-mentioned image information is searched from the second data base, wherein the management information in the image information from the first data base is recognized and analyzed and coded and then this coded management information is written as search information in the second data base together with the image information. The invention also intends to provide an apparatus which can correct the search information to a desired key word (search information) such that the user can easily search a desired image information, namely, an apparatus which can seemingly correct the search information to the search information between the second data base and the user while keeping with the search information as it is between the first and second data bases.

Still another object of the invention is to provide, in consideration of the above-mentioned points, an image information searching apparatus comprising:

scanning means for scanning a recording medium in which image information was recorded;

this image information including discriminating information to discriminate the image information or a plurality of image information of the same group from another image information;

dictionary information memory section in which dictionary information to recognize the foregoing discriminating information was stored;

recognition control section to recognize the discriminating information using the dictionary information stored in the dictionary information memory section; and image information memory section to store the recognized discriminating information as search information together with the corresponding image information.

Still another object of the invention is to provide, in consideration of the above-mentioned points, an image information searching apparatus comprising:

a cassette to enclose a recording medium in which a plurality of image information were recorded;

scanning means for starting the scan of the image information recorded in the recording medium in the case where the cassette was attached into the apparatus;

a first memory to store the image information read by the scanning means;

a second memory to preliminarily store a character pattern; and character deciding means for reading out the image information stored in the first memory and the character pattern stored in the second memory and thereby recognizing the character information included in the image information read out.

Still another object of the invention is to provide, in consideration of the above-mentioned points, an image information searching apparatus comprising:

scanning means for scanning discriminating information which is included in image information and is used to discriminate an image or image information included in the same category including this image from another image information;

recognizing means for analyzing the discriminating information read out by the scanning means;

modifying means for performing the editing such as correction, change, addition, or the like of the discriminating information recognized by the recognizing means; and image information memory means for storing the discriminating information edited by the modifying means and the image information corresponding thereto by correlating this information.

BRIEF DESCRIPTION OF THE DRAWINGS

FIG. 1 is an arrangement block diagram showing one example of an image character recognizing apparatus of the present invention;

DETAILED DESCRIPTION OF THE PREFERRED EMBODIMENTS

Figure 2:
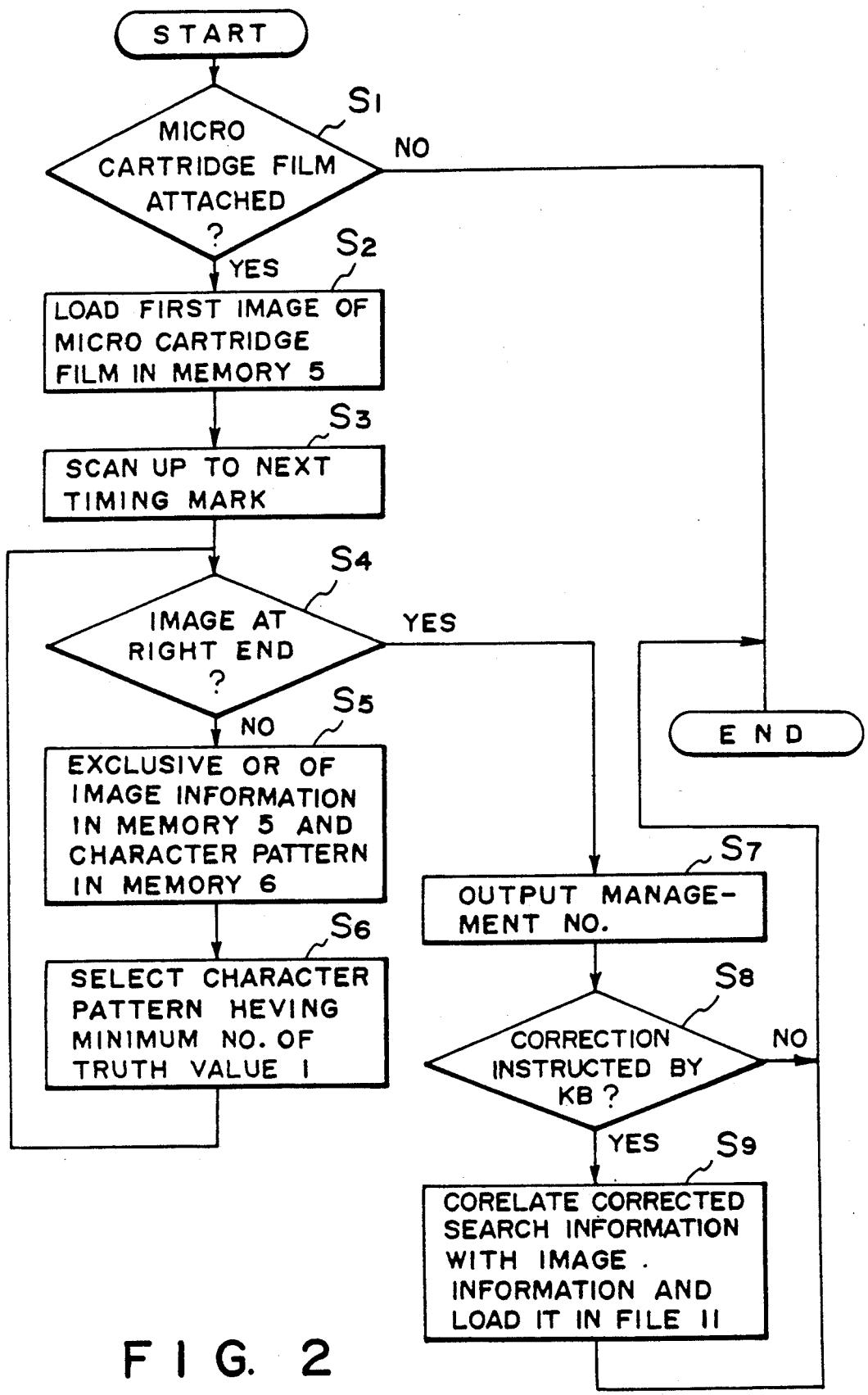
FIG. 2 is a flowchart to explain the recognizing operation of the management character number of a micro cartridge film.

The present invention will now be described in detail hereinbelow with reference to the drawings.

The image information searching apparatus which is described in this invention may be obviously a part of an integrated electronic file system including electronic files, microfilms, an image reader, a printer, and the like or may be a sole searching apparatus for image information in microfilms or the like.

FIG. 1 is an arrangement block diagram showing one embodiment of the image character recognizing apparatus of the invention. In the diagram, a reference numeral 1 denotes an electronic micro reader to read a micro cartridge film 9 (mentioned later); 2 is a film detector to detect the attachment or detachment of the micro cartridge film which is attached into the electronic micro reader 1 (this film detector may be of the mechanical type or may be constituted using a photo diode or the like); 3 a central processing unit (CPU); and 3a character deciding means which reads character information in image information and accesses a character pattern at random which has preliminarily stored in a second memory 6 and then gets an exclusive OR of both of the read character information and this character pattern, thereby recognizing the character information. The character deciding means 3a is provided in the CPU 3. A numeral 4 is a memory to access control information (program shown in FIG. 2) of the CPU 3 at random; and 5 is a first memory to store the image information read by the electronic micro reader 1 and to access the image information at random to the CPU 3. The first memory 5 is a disc file to input image information together with search information which will be mentioned later. The first memory and disc file may be independently provided. In other words, the first memory is used to temporarily store the image information read by the micro reader. Another disc file 11 may be further provided to store &he search information together with the image information after the search information was produced. A numeral 7 is an image display to display the character information recognized by the character deciding means 3a; 8 is an image printer to print out the character information recognized by the character deciding means 3a; and 12 is a keyboard serving as an operating section to perform the control operation of the overall apparatus and correction of the search information.

As described above, the image character recognizing apparatus is constituted by: the electronic micro reader to read the image information which has preliminarily been photographed in the first image of the micro cartridge film; the film detector to detect the attachment or detachment of the micro cartridge film into the electronic micro reader; the first memory to store the image information; the second memory to preliminarily store the character pattern; the character deciding means for reading out the image information stored in the first memory and the character pattern stored in the second memory and thereby recognizing the character information included in the image information; and the display section to display the character information recognized by the character deciding means. Therefore, this apparatus has an advantage such that the character information is read and analyzed immediately after the micro cartridge film was attached and the management character number of the micro cartridge film can be freely recognized.

In this embodiment, the roll film of 16 mm is used as a micro cartridge film and the character image information is photographed in the micro cartridge film from the first frame. This character image information is constituted in the following manner.

Namely, a plurality of timing marks are irregularly added into one frame on the head image of the micro cartridge film and a set of character patterns are arranged only in the horizontal direction just after each timing mark and are photographed (which will be explained later in FIG. 3). It is apparently possible to adopt any method as a method of determining the recording positions and arrangement of those marks and character patterns.

The operation to recognize the management character number of the micro cartridge film will then be explained with reference to a flowchart of FIG. 2, in which S1 to S6 represent steps.

First, a check is made to see if the micro cartridge film is attached to the electronic micro reader 1 or not (S1). If it is YES in (S1), the first image in the micro cartridge film is loaded into the first memory 5 (S2) and then the image from the left end to the next timing mark is scanned (S3). Subsequently, a check is made to see if the scanning point is at the right end of the image or not (either the right end or the left end may be used) (S4). If it is NO in (S4), the image information is read out from the first memory 5 and then all of the character patterns stored in the second memory 6 are sequentially read out and an exclusive OR of both of the image information and the character pattern is obtained (S5). The number of truth values 1 is measured for every character pattern and the character pattern having the minimum number of truth values 1 is selected (character recognition) (S6). The above-mentioned steps S4 to S6 are executed until the right end of the image and the character pattern is produced. Then, the management character number of a desired micro cartridge film is displayed in the image display 7 or is printed out by the image printer 8 (in step S7), so that the operator can recognize the key word by the character string. (This management character number may be also stored into the file simultaneously with the output.) On the other hand, to further enable the key word to be changed to the key word that can be easily searched by the user, a check is made in step S8 to see if the correction of the search information is instructed from the keyboard or not. If it is instructed, the original management number, image information, and corrected management number (search information) are correlated and are loaded in the disc file 11 in step S9. If the correction is not instructed and if it is NO in step S1, the control is finished.

Although the image display 7 and image printer 8 were shown as display sections in the foregoing embodiments, either one of them may be used.

Figure 3:
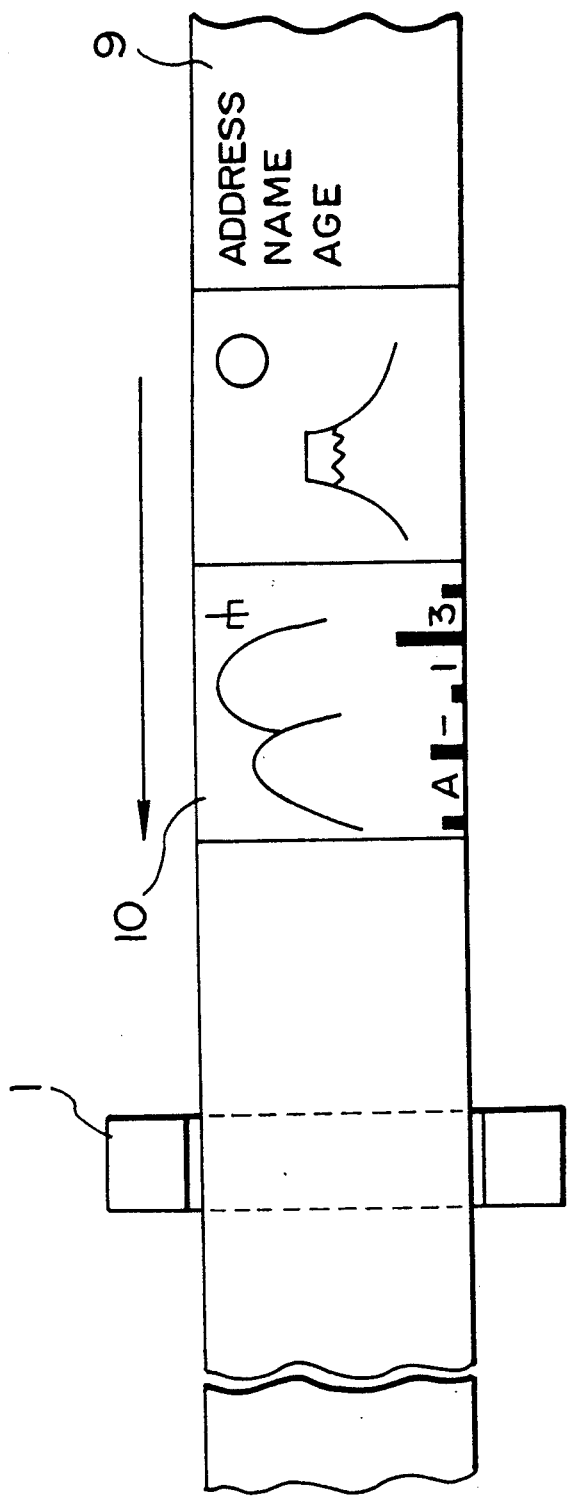
FIG. 3 shows a recording example of image information of the micro cartridge film.

FIG. 3 shows a recording example of the image information of the micro cartridge film mentioned above. A numeral 9 is the micro cartridge film; 10 is a first image; and 1 is the electronic micro reader. This diagram shows that the micro cartridge film is moving in the direction of an arrow. An explanation will be further made in conjunction with FIG. 2 as well. The information representative of the kind of image, for example, character pattern is photographed in the first image 10 and the key word or the like is read and analyzed until the electronic micro reader detects the right end of the image, thereby producing the key word (search information) to search the image or a series of subsequent images. This search information is loaded into the first memory (or disk file 11) together with the image information to be searched. Simultaneously, this information is displayed by the image display 7 or is printed by the image printer 8. As mentioned above, the search information may be corrected or modified on the display such that the user can easily search a desired image information.

What is claimed is:

1. An image information searching apparatus comprising:
    a cassette for containing therein a recording medium in which a plurality of portions of image information have been recorded, a first portion of the image information including character information for discriminating the plurality of portions of image information in said cassette from those in another cassette;
    determining means for determining whether said cassette has been attached to said apparatus;
    scanning means for scanning the entire first portion of image information recorded in the recording medium when said determining means determines that said cassette has been attached to said apparatus;
    first memory means for storing the image information read by said scanning means;
    second memory means for preliminarily storing a character pattern; and
    character deciding means for reading out the image information stored in said first memory means and the character pattern stored in said second memory means and for recognizing the character information for discrimination included in the image information stored in said first memory means.

2. An apparatus according to claim 1, wherein said cassette is a cassette to enclose microfilms, papers or the like.

3. An apparatus according to claim 1, wherein said character information is discriminating information to discriminate the image information included in the same category as the image information from another image information.

4. An apparatus according to claim 1 further comprising output means for outputting the result of said character deciding means.

5. An apparatus according to claim 1, wherein said scanning means also detects the attachment and detachment of said cassette.

6. An image information searching system comprising:
    determining means for determining whether a cassette storing image information therein has been attached to said system;
    scanning means for scanning an entire first portion of a group of the image information, the first portion of the group of the image information including discriminating information for discriminating the group of the image information from another group, when said determining means determines that the cassette has been attached to said system;
    recognizing means for recognizing the discriminating information included in the group of image information obtained by a scan by said scanning means;
    modifying means for performing editing of the discriminating information recognized by said recognizing means; and
    image information memory means for storing the discriminating information edited by said modifying means and image information corresponding to the edited discriminating information.

7. A system according to claim 6, wherein said scanning means scans the image information.

8. A system according to claim 6, wherein said modifying means is an input section which can input a desired pattern information.

9. A system according to claim 6, wherein the discriminating information recognized by said recognizing means, the information obtained by editing the discriminating information, and the corresponding image information are stored in said memory means by correlating the recognized discriminating information, the edited information and the corresponding image information.

* * * * *

UNITED STATES PATENT AND TRADEMARK OFFICE
CERTIFICATE OF CORRECTION

PATENT NO. : 5,038,379
DATED : August 6, 1991
INVENTOR(S) : Yoshitaka Sano

It is certified that error appears in the above-identified patent and that said Letters Patent is hereby corrected as shown below:

SHEET 2 OF THE DRAWINGS
    Figure 2, in Step 6, "HEVING" should read --HAVING--; in Step 9, "CORELATE" should read --CORRELATE--.

COLUMN 1
    Line 32 "in a "sizing" should read --realizing--.

Signed and Sealed this

Sixteenth Day of February, 1993

Attest:

STEPHEN G. KUNIN

Attesting Officer    Acting Commissioner of Patents and Trademarks